United States Patent [19]

Kuhns

[11] Patent Number: 4,666,610

[45] Date of Patent: May 19, 1987

[54] METHOD AND PRODUCT FOR REMOVAL OF CHLORAMINES, CHLORINE AND AMMONIA FROM AQUACULTURE WATER

[75] Inventor: John F. Kuhns, Kansas City, Mo.

[73] Assignee: Aquascience Research Group, Inc., North Kansas City, Mo.

[21] Appl. No.: 738,481

[22] Filed: May 28, 1985

[51] Int. Cl.$^4$ .............................................. C02F 1/20
[52] U.S. Cl. .................................... 210/749; 210/750; 210/754; 210/756; 210/903; 210/916
[58] Field of Search .................. 119/3; 210/718, 719, 210/729, 749, 750, 753–757, 903, 908, 916

[56] References Cited

U.S. PATENT DOCUMENTS

| 3,446,733 | 5/1969 | Shell | 210/749 |
| 3,505,217 | 4/1970 | Morico | 210/757 |
| 3,843,545 | 10/1974 | Heuston | 210/753 |
| 4,364,835 | 12/1982 | Cheh | 210/755 |
| 4,385,996 | 5/1983 | McCarthy | 210/719 |

FOREIGN PATENT DOCUMENTS

| 1152388 | 5/1969 | United Kingdom | 210/916 |
| 823311 | 4/1981 | U.S.S.R. | 210/749 |

OTHER PUBLICATIONS

Blasiola, George C., "Chloramines", *Pet Age*, Jul., 1984, pp. 25–26.
Herwig, Nelson, "Toxic Chloramine Induced Intravascular Hemolytic Anemia in Fish", *Freshwater and Marine Aquarium*, 5(10), pp. 11–13, 91–92, 1982.
Wheaton, Fredrick Warner, *Aquacultural Engineering*, pp. 608–612, 1977.
Allied Chemical Corporation, "Dechlorination", 1977.
Helz, George R. and Lynn Kosak-Channing, "Dechlorination of Wastewater and Cooling Water", *Environ. Sci. & Tech.*, 18(2), pp. 48A–55A, 1984.
Morrison, Robert T. and Robert N. Boyd, *Organic Chemistry*, 2nd edition, pp. 639–641, 1966.
Walker, J. Frederic, *Formaldehyde*, 3rd edition, pp. 219, 251–253, 486–488, 621–623, 638, 1975.

*Primary Examiner*—Peter Hruskoci
*Attorney, Agent, or Firm*—Kokjer, Kircher, Bradley, Wharton, Bowman & Johnson

[57] ABSTRACT

A process for neutralizing chloramines, chlorine and ammonia in marine and fresh waters by adding an alkali metal formaldehydebisulfite in a dry or solution form in which the alkali metal formaldehydebisulfite is selected from the group consisting of sodium formaldehydebisulfite and potassium formaldehydebisulfite. Preferably, the alkali metal formaldehydebisulfite is sodium formaldehydebisulfite added in the amount at least equal to the greater of the quantity required to react on a one to one molecular basis with 4 times the stoichiometric amount of ammonia, 12 times the stoichiometric amount of monochloramine, 10 times the stoichiometric amount of dichloramine or 12 times the stoichiometric amount of chlorine in the form of hypochlorites present in the water to be treated.

48 Claims, No Drawings

METHOD AND PRODUCT FOR REMOVAL OF CHLORAMINES, CHLORINE AND AMMONIA FROM AQUACULTURE WATER

BACKGROUND OF THE INVENTION

This invention relates to a method and product for water quality management for aquaculturists. More specifically, the invention relates to the simultaneous removal of chloramines, chlorine and ammonia which are toxic to aquatic life.

The culture of aquatic organisms, also known as aquaculture, in the U.S. and elsewhere for food, recreation, education, research, and hobby purposes is a fast growing industry. The world production from 1971 to 1978 of fishes, crustaceans and molluscs raised for food exceeded 10 million pounds. In the U.S. alone these same species exceeded 184 million pounds in 1980 If nonfood baitfish and aquarium species were added to the U.S. production in 1980, then aquacultured animals would represent more than 206 million pounds This translates into a total commercial value of over 210 million dollars In short, aquaculture is big business and its growth continues at a significant rate. The profit potential in aquaculture has created such incentives that its many enterprises and operations quickly outdistance the supporting sciences and technologies This results, not only in production losses and failure to meet product demands, but also in heavy financial losses.

Two areas in particular stand out as sources of frustration and lost profits for aquaculturists. These are disease management and water quality management. Although the present invention is particularly related to water quality management, it should be noted that chemotherapeutic treatmert for disease management is enhanced when high standards of water quality are maintained.

With fishes and other aquatic animals, just as with other animals and humans, if a proper, non-stressful environment is provided then the incidence of disease conditions is all but eliminated. Two major types of systems exist for raising aquatic life. These are closed and open systems. There are two types of closed systems; the closed, recirculating system, and the closed, non-recirculating system. The closed, recirculating system, such as a home aquarium, is characterized by a fixed volume of water which is continuously or intermittently circulated through a fish holding tank. The closed, non-recirculating system, such as a farm pond, is characterized by a fixed volume (usually greater than in the previous example) of water to which fresh makeup water is added, as needed, such as for compensation for evaporation. In a non-recirculating, flow-through system, such as a raceway used to raise trout, fresh makeup water is continuously fed to the fish holding structure while a like quantity of water is continuously withdrawn from the structure. The water environment of the closed, recirculating system can be controlled with intensive care and maintenance. The water quality of a closed, non-recirculating system is very difficult to control except by more or less natural means (i.e., photosynthetic process to provide oxygen and bacterial processes to convert toxic wastes). The non-recirculating, flow-through water systems often have problems similar to closed systems, but environmental control in flow-through systems is generally as difficult as in closed non-recirculating systems. In either system, the objective of successful water quality management is the removal or neutralization of toxic substances which stress cultured aquatic life forms and thereby to add significantly to the production and profitability of aquaculture.

Among the many compounds found in natural, waste and potable waters which are toxic to aquatic organisms, ammonia ($NH_3$), chlorine in the form of hypochlorus acid (HOCl) and hypochlorites ($OCl^-$), and chloramines ($NH_2Cl$, $NHCl_2$) are among the most toxic and ubiquitous.

Ammonia is present in natural waters as a result of animal metabolism of proteins; urinary, fecal and respiratory wastes; and bacterial mineralization of nitrogenous bases. This means that the aquatic organisms (fishes, crustaceans, molluscs, etc.) themselves contribute significant, toxic pollutants to their own water. In waste water these same sources, as well as technological wastes, account for ammonia presence. Ammonia in potable water is due to the failure to remove it in the purification process or due to the purposeful addition for quality control. In a review of management practices, researcher Stephen Spotte (Fish and invertebrate culture, John Wiley & Sons, New York, 1979) observed that current evidence indicates that $NH_3$ is significantly more toxic than its ionic form, $NH_4^+$ (ammonium). Even if this were not true, to attempt to control the factors such as pH, temperature and salinity that effect the $NH_3:NH_4^+$ ratio could be more harmful and costly. Spotte suggested that management techniques be targeted to remove as many sources of ammonia as possible from the culture water such as uneaten food, dead animals and plants and to keep the densities of cultured species moderate and to not allow the total ammonia level to exceed 0.13 ppm (0.13 mg $NH_4^+$ per liter of culture water). The problem with Spotte's suggestions is that for commercial aquaculturists moderate densities of cultured animals are seldom profitable and for aquarium hobbyists there is always room for one more fish in an already overcrowded aquarium.

Other respected researchers have warned of the dangers of ammonia in aquaculture. The safe level for salmonids such as trout and salmon is considered to be from 0.005 to 0.02 ppm. As a predisposing factor in bacterial gill disease of cultured food fishes, ammonia levels over 0.3 ppm are considered dangerous.

When the foregoing standards for water quality are compared to ammonia levels which can be encountered in both culture water and natural waters, the serious nature of this problem can be better appreciated. The ammonia levels in wastewater can range up to and over 5000 ppm. In aquarium and aquaculture systems it is not unusual to encounter total ammonia concentrations of between 1.0 and 3.0 ppm.

Another fish threatening substance is chlorine. Chlorine is most often present in water as a result of disinfection processes. It is not found in natural waters unless there has been contamination from wastewater or potable water sources. Aquaculturists and aquarists simply have no direct control over the quantity of chlorine, or associated chloramines, introduced to municipal water supplies. However, no matter what the initial concentration of chlorine, or chloramines, it must be reduced to zero before any water in which it is present can be safely used for culture purposes. Levels of chlorine from 0.2 to 0.3 ppm are rapidly toxic to fishes. The U.S. Environmental Protection Agency recommends an upper level of 0.003 ppm for continuous exposure by coldwater and warmwater fishes. Chlorine levels in municipal water supplies range up to 2.5 ppm. When used as a disinfectant agent for cleaning aquariums, the recommended solution typically contains 50 ppm chlorine. Accordingly, the aquarium must be very thoroughly rinsed to remove any trace of the chlorine after cleaning.

Chloramines are most often present in water for the same reasons as the presence of chlorine. However, some chloramines in natural and waste waters result from the chemical combination of chlorine with the ammonia normally found in these waters. The chloramine level in a given water can range quite high to over 5000 ppm, but the levels encountered in most municipal tap waters is in the range of 0.5 to 4.0 ppm. Even the latter range represents a deadly concentration level for aquatic life.

The reduction in concentrations of these toxic components in water, when their initial introduction cannot be controlled, is crucial in the culture, maintenance and display of freshwater, brackish water (estuarine), and marine organisms. In addition, the timely reduction in concentrations of these toxic components is also desirable.

In the case of chlorine a process of reductive dechlorination is most often practiced. However, granular activated carbon is also used as a chemical adsorbant to remove chlorine from water. Ammonia removal can be accomplished by adsorption on zeolites like clinoptilolite and phillipsite and by bacterial nitrification. The efficiencies of these two processes are effected by contact time (i.e., how long the water is in contact with the adsorbant or bacterial bed) and other conditions such as temperature, dissolved oxygen levels, the presence of interferring substances (i.e., certain antibiotics in the case of nitrifying bacterial beds, and highly surface active organics in the case of chemical adsorbants), and maintenance procedures (i.e., cleaning routines) of the filters themselves. Chloramines can be removed by reductive dechlorination followed by adsorption or nitrification of the freed ammonia.

Dechlorination has been shown to be a highly reliable process and one which works well under most conditions found in culture water, the term referring to the water used to maintain, grow or breed aquatic plants and animals. One problem with this process presents itself when thiosulfates, $S_2O_3^-$ (the substances used in the majority of commercially available dechlorinators), are used; excess thiosulfate ion reacts with dissolved oxygen in water and inadvertent or purposeful overdosing can result in a reduction of dissolved oxygen in culture water which can in turn cause respiratory stress in the cultured organisms. In addition, many commercially available dechlorinators have been found to be inadequate for complete dechlorination of even relatively lightly chlorinated (i.e., less than 4.0 ppm total chlorine) potable waters. The use of granular activated carbon has been common and is most often employed in laboratories for the preparation of chlorine-free culture water. Nevertheless, a recent study details the problems associated with using granular activated carbon alone as a method of dechlorinating water for aquatic toxicological studies. Stephen J. Mitchell and Joseph J. Cech, Jr., 1983, "Ammonia-caused gill damage in channel catfish (Ictalurus punctatus): confounding effects of residual chlorine", Can. J., Fish. Aquat. Sci., 40(2), pp. 242-247.

The elimination of chloramines (i.e., dechloramination) from water used for culture purposes has reached more creative levels. One method currently used is to dechlorinate with the usual dechlorinators then remove the freed ammonia by adsorption on granular clinoptilolite placed in a filtering device or by addition the finely divided, powder, clinoptilolite directly to the water. In actuality, most dechloramination is achieved by dechlorinating in the usual way and allowing the ammonia to be oxidized by nitrifying bacteria. Just as with chlorine, granular activated carbon has been used to remove chloramines from water, but this process has also been questioned by the Mitchell and Cech study in 1983. The same study showed that partial dechlorination allowed the residual chlorine to potentiate the toxic effects of ammonia on fish.

The removal of ammonia released into water when chloramines are dechlorinated is likewise problematical. Biological filtration is a process of bacterial conversion or nitrification of toxic ammonia and nitrite ions ($NO_2^-$) to less toxic nitrate ions ($NO_3^-$). Biological filtration, however, is easily interrupted and inhibited, and the intermediate product, nitrite ions ($NO_2^-$), is significantly more toxic to aquatic organisms than the precursor ammonia. Until a biological filter bed is fully conditioned and properly functioning (an average of 21 days), there is a constant increase in the concentration of the nitrite ions until the precursor ammonia is reduced below its inhibiting (to the nitrite converting Nitrobacter species of bacteria) concentrations.

The removal of ammonia by adsorption has its own set of problems. Among these are flow rate and contact time, adsorbant grain size, temperature, adsorbant capacity, and the concentration of interfering ions such as sodium ($Na^+$) and potassium ($K^+$). Clinoptilolite has approximately 5% of the capacity in salt water that it exhibits in freshwater and, therefore, correspondingly larger quantities of this adsorbant are required for a salt water application.

Commercial products do currently exist which claim to remove or neutralize one or more of the toxic substances chlorine, chloramines and ammonia. However, they all suffer from one or more of the above described shortcomings. Simple dechlorinators, if properly dosed will completely neutralize chlorine. These same dechlorinators will break the chlorine-ammonia bonds in chloramines and neutralize the chlorine but will not neutralize the freed ammonia. Ammonia adsorbants, if used properly will adsorb and remove ammonia from water, but will have no effect upon any chlorine present and they will not function properly in saline waters. Biological filters will maintain ammonia concentrations at low levels, even in saline waters, but they require a long start-up time (up to 21 days), are slow to react to increased ammonia loads, and require a relatively narrow range of operating conditions. Products which are combinations of dechlorinators and ammonia adsorbants will not function in saline waters and cause a temporary cloudiness in the treated water due to the dispersion of the finely divided adsorbant.

Accordingly, aquaculture needs a safe and effective way to remove chloramines, chlorine and ammonia which overcomes the limitations, dangers and shortcomings of the various techniques presently employed. The primary goal of this invention is to fulfill this need in the industry.

More specifically, an object of the invention is to provide a product and method for the removal of chloramines, chlorine and ammonia which, unlike existing zeolites and ion-exchange resins, functions as well in saline water as it does in freshwater treatment.

Another object of the invention is to provide a completely safe product and method for the removal of chlorine, chloramine and ammonia which is non-toxic to fishes, aquatic invertebrates, marine and freshwater algaes, and aquatic plants.

Another object of the invention is to provide a product and method for the removal of chloramines, chlorine and ammonia which does not cause clouding in hard or soft water or in salt water as do products which contain insoluble zeolites.

Yet another object of the invention is to provide a product and method for the removal of chloramines, chlorine and ammonia in which the time required for neutralization is greatly reduced from the time required by earlier techniques. With this invention, neutralization times vary from one to five minutes for "free" chlorine (hypochlorites), ten to thirty minutes for chloramines ("combined" chlorine), and twelve minutes to one hour for free ammonia.

An additional object of the invention is to provide a product and method for the removal of chloramines, chlorine and ammonia which does not react with dissolved oxygen in either freshwaters or saline waters.

Another object of the invention is to provide a product and method for the removal of chloramines, chlorine and ammonia which is not pH dependent and functions equally well throughout the "normal" pH range, 5.0 to 9.0, of waters in which most aquatic life is found.

Another object of the invention is to provide a product and method for the removal of chloramines, chlorine and ammonia which is largely uninhibited by the presence of commonly used antibiotics such as chloramphenicol, nitrofurans, and sulfa drugs, or by the presence of antiparsiticals such as copper sulfate, metronidazole and formaldehyde.

A further object of the invention is to provide a product and method for the removal of chloramines, chlorine and ammonia which can be combined with water conditioning chemicals such as other dechlorinators, electrolyte mixes, and trace element mixes.

Yet a further object of the invention is to provide a product and method of the character described which is safe, reliable and economical to effect removal of chloramines, chlorine and ammonia.

Other and further objects of the invention, together with the features of novelty appurtenant thereto, will appear in the course of the following description of the invention.

SUMMARY OF THE INVENTION

I have discovered that an alkali metal formaldehydebisulfite effectively neutralizes chloramines, chlorine and ammonia from saline and fresh waters for use in aquaculture. A pure alkali metal formaldehydebisulfite, a mixture of alkali metal formaldehydebisulfites, or a mixture of one or more alkali metal formaldehydebisulfites with various diluents, carriers or other ingredients can be utilized directly in untreated water to neutralize by chemical reaction any aqueous chloramines, chlorine and ammonia which may be present in order to render the water nontoxic for aquatic life. The water treatment product can be manufactured either in a dry form (i.e., powder, granule, flake, tablet, cake, pellet, bolus, capsule) with or without additives, or in a water solution with or without other dissolved or suspended substances.

In summary, the invention relates to a process for neutralizing chloramines, chlorine and ammonia in water by adding an alkali metal formaldehydebisulfite in a dry or solution form in which the alkali metal formaldehydebisulfite is selected from the group consisting of sodium formaldehydebisulfite and potassium formaldehydebisulfite. In a preferred embodiment, the alkali metal formaldehydebisulfite is sodium formaldehydebisulfite added in the amount at least equal to the greater of the quantity required to react on a one to one molecular basis with a reactant selected from the group consisting of 4 times the stoichiometric amount of ammonia, 12 times the stoichiometric amount of monochloramine, 10 times the stoichiometric amount of dichloramine and 12 times the stoichiometric amount of chlorine in the form of hypochlorites present in the water to be treated.

DETAILED DESCRIPTION OF THE INVENTION

Unless otherwise stated herein, indication of parts or percentages are given on a weight basis.

I have discovered that an alkali metal formaldehydebisulfite is unexpectedly effective and safe to neutralize chlorine, chloramine and ammonia from saline and fresh waters for use in aquaculture. A pure alkali metal formaldehydebisulfite, a mixture of alkali metal formaldehydebisulfites, or a mixture of one or more alkali metal formaldehydebisulfites with various diluents, carriers or other inert ingredients can be utilized directly in dry or solution form in untreated water to neutralize by chemical reaction any aqueous chloramines, chlorine and ammonia which may be present in order to render the water nontoxic for aquatic life.

Neither the reaction mechanism, nor the reaction products, by which the phenomena of neutralizing chloramines, chlorine and ammonia in water with an alkali metal formaldehydebisulfite is understood. However, experimental research shows reaction completion of sodium formaldehydebisulfite and the representative target compounds including free chlorine in the form of sodium hypochlorite (NaOCl), free ammonia ($NH_3$), and monochloramine ($NH_2Cl$) to eliminate the toxic effects of the target compounds in aquaculture. The results show that under conditions of varying pH, hardness, and salinity that sodium formaldehydebisulfite was capable of simultaneously reducing the concentrations of all three representative target compounds to safe levels. Further research indicates effectiveness under representative aquaculture working conditions by reducing free ammonia levels in existing freshwater and marine aquarium water and by neutralizing free chlorine and chloramines in freshly drawn potable tap water.

As used herein, the terms "remove" and "neutralize" are used interchangeably to refer to the discovered ability of alkali metal formaldehydebisulfites to render nontoxic to aquatic life the chloramines, chlorine and ammonia existing in natural and culture waters.

The alkali metal formaldehydebisulfites useful in this invention include sodium formaldehydebisulfite and potassium formaldehydebisulfite. The compound sodium formaldehydebisulfite has the chemical formula $HOCH_2SO_3Na$, and is also known as formaldehyde sodium bisulfite and sodium hydroxymethane sulfonate. The compound potassium formaldehydebisulfite has the chemical formula $HOCH_2SO_3K$, and is also known as formaldehyde potassium bisulfite and potassium hydroxymethane sulfonate.

The alkali metal formaldehydebisulfites may be utilized in the dry form with a variety of inert materials- such as diluents, carriers, excipients, lubricants, disintegrants, and colorants. A diluent (i.e., tricalcium phosphate) is an inert material used to reduce the concentration of an active material to achieve a desirable and beneficial effect. A carrier (i.e., salt) is an inert material used to deliver or disperse an active material. Suitable diluents and carriers for use with alkali metal formaldehydebisulfites include salt and other similar, nonreactive, neutral electrolytes such as sodium sulfate and potassium chloride, and non-electrolytes and insoluble salts such as starch, sugars, clays, and calcium sulfate. An excipient (i.e., starch) is an inert material used as a binder in tablets. Suitable excipients for use with alkali metal formaldehydebisulfites include polymers and gums such as cellulose gum and povidone, and starches. A lubricant (i.e., magnesium stearate) is an inert material used to reduce friction during filling or tableting processes. Suitable lubricants for use with alkali metal formaldehydebisulfites include fatty acid salts such as calcium stearate or magnesium stearate, and paraffinic compounds and fatty acids such as paraffin wax and stearic acid. A disintegrant is an inert material that causes tablets and boluses to burst upon exposure to appropriate conditions. Suitable disintegrant for use with alkali metal formaldehydebisulfites include polymers such as cross-linked povidone, and effervescent mixtures such as sodium bicarbonate/citric acid. A colorant is an inert material which imparts color to another material or mixture. Suitable colorants for use with alkali metal formaldehydebisulfites include lakes (i.e., organic pigments on an adsorptive inorganic substrate) such as rose madder, and non-oxidizing dyes such as acriflavine.

The pure, dry active alkali metal formaldehydebisulfite may be packaged in containers such as bottles, boxes, non-porous bags, and drums which serve to protect the integrity of the product and to allow for appropriate dispensing. Other dry forms of the product for use in this invention include unit dose tablets, capsules, boluses or packets. Individual dosage units may be weighed or measured by bulk volume if supplied in the form of powders, granules, pellets, or flakes. Larger unit dose requirements, such as for ponds, lakes, or streams can be applied as a dry-manufactured cake.

The alkali metal formaldehydebisulfite may be used directly for water treatment. As with many process chemicals, however, proper performance of a consumer formulation is often best achieved by providinq a dosage form which is easily applied and only requires commonly available volumetric measuring devices such as teaspoons (1/6 fl.oz, 4.93 mL), tablespoons (⅓ fl.oz., 9.86 mL) or cups (8 fl.oz., 236.64 mL). Although weight measurement of solids is routinely very accurate, it is quite uncommon for consumers to employ such measurements when using water conditioning chemicals and similar products. The use of pre-weighed unit dosages of a pure substance or its mixtures in the form of tablets, boluses, capsules or packets is the typical and preferred method to deliver dry forms. Such method works quite well for this invention. Equally satisfactory, however, is a formulation as a dry powder or granular mixture of a consistency which readily lends itself to accurate and repeatable volumetric dosage measurements.

To illustrate the foregoing principals with respect to suitable formulations, the following dry forms of product represent convenient formulations adapted for easy use by the lay consumer:

(1) Unit-dose tablet containing 1.18 grams of active ingredient sodium formaldehydebisulfite and 0.80 grams of diluent salt and 0.02 grams of lubricant magnesium stearate designed to treat 10 gallons (37.8 liters) of municipal water containing up to 2.5 ppm (2.5 mg/liter) of chlorine as monochloramine.

(2) Multi-dose package containing 1 pound (453.6 grams) of a mixture of 9.44 ounces (267.6 grams) of sodium formaldehydebisulfite and 6.56 ounces (186.0 grams) of fine blending salt which is to be dosed at the rate of 1 teaspoonful (approximately 5 mL or 10 grams) per 10 gallons (37.8 liters) of aquarium water, either freshwater or marine, containing up to 1.0 ppm (1.0 mg/liter) of free ammonia ($NH_3$).

The formulation of the aquaculture product in solution form, whether by direct dissolution of the active ingredient or in situ synthesis of the product by reaction of formaldehyde gas or solution with sodium bisulfite solution at the the point of manufacture or just prior to being added the water to be treated is inherently simple, convenient and inexpensive. Highly purified sodium formaldehydebisulfite is commercially available in large quantities. It is easily and completely soluble in water and produces a solution which is clear, colorless, odorless and stable within a pH range of 6.0 to 8.0.

To illustrate the foregoing principals with respect to suitable liquid formulations, the following solution forms of product represent convenient formulations adapted for easy use by the lay consumer:

(1) A two-part product consisting of a 9.525% solution of formaldehyde ($CH_2O$) in water with or without suitable preservatives and/or buffers (i.e., methanol, phosphate buffer) and a second solution of a 33.01% solution of sodium bisulfite ($NaHSO_3$) in water. The two solutions to be combined, in equal portions by weight, and used at the rate of 5 mL per 10 gallons (37.8 liters) to treat pond water containing 1.0 ppm (1 mg/liter) free ammonia.

(2) A single solution containing 21.27% sodium formaldehydebisulfite in water, to be used at the rate of 1 teaspoon (approximately 5 mL) per 20 gallons (75.7 liters) for the treatment of potable water containing 2.0 ppm (2.0 mg/liter) combined chlorine.

The consumer oriented single solution may be used as a dose of 1 teaspoonful (4.93 mL) per 20 gallons (75.7L) of water for neutralizing up to 4.0 ppm monochloramine measured as combined chlorine, or 1 teaspoonful per 10 gallons (37.85 L) for neutralizing up to 1 ppm ammonia measured as free ammonia. In each instance, the recommended dilution represents approximately 4 times the required stoichiometric amounts of sodium formaldehydebisulfite required to react with the pollutants. Such a product is perfectly capable of neutralizing chlorine in the form of hypochlorites without the addition of any other dechlorinator. Such a product would not be expected to neutralize any ammonia present as the ammonium ion. However, this of course is relatively unimportant because of the non-toxic nature of the ionized form. Reaction with chlorine in both the "free" and "combined" forms can be expected to proceed as quickly as with all-purpose water conditioners (i.e., complete within 10 minutes). The reaction with ammonia can be expected to take longer depending upon the initial concentration of the free ammonia. In usual practice, complete deamination can be expected within 1 hour at an initial concentration of 1 ppm ammonia.

Unlike products containing mixtures of thiosulfates and clinoptilolite, sodium formaldehydebisulfite solutions function in saltwater as easily as in freshwater, and there will be no clouding. The sodium formaldehydebisulfite solution is of necessity colorless because of its incompatibility with arylmethane and other similar oxidizing dyes. Methylene blue, a sulfur-containing, oxidizing dye is stable in an sodium formaldehydebisulfite solution for a short period of time, but because of the objectionable properties of this dye, it is not recommended as a coloring agent.

In the various product formulations of this invention, the usual practices of cleanliness and sanitation are to be followed as these relate to the conditions of mixing, packaging and storage. The purity and grades of the various ingredients including formaldehyde gas, formaldehyde solution, sodium bisulfite, sodium formaldehydebisulfite, potassium formaldehydebisulfite, methanol, salt, starch, tableting excipients, tableting lubricants, cross-povidone, buffers and their components, colorants and dyes, diluents and carriers, and water may vary from standard commercial or technical grades to the highly purified, reagent or pharmaceutical grades. The physical forms of the various solid components may vary from ultra-fine powders to granular and flake forms. Liquid components should be free from suspended or precipitated material, but should such material be present it should be removed by suitable settling and decantation or filtering. Any water should be similarly free of suspended or precipitated material as well as free from free or combined chlorine, including chloramines, and free or ionized ammonia. In addition, the water must be free of other free halogens such as iodine (I) and bromine (Br) and their combined forms which may reduce the final required concentration of the sodium formaldehydebisulfite. Neutralization or removal of potentially interfering substances would be permissible prior to the addition or formation of the sodium formaldehydebisulfite. With observance of the foregoing, any potable water source may be used in the manufacturing process.

All components used in the production of these aquaculture products must be free from, or rendered free from, substances which may be toxic or otherwise detrimental to fish, aquatic invertebrates, aquatic algae plants and other aquatic life.

Both acids and alkalies hasten the decomposition of the sodium formaldehydebisulfite. Therefore, solutions of sodium formaldehydebisulfite must be manufactured so that the final pH lies between 6.0 and 8.0. Dry formulations must be manufactured so that if the resultant mixture is hygroscopic, then decomposition of the sodium formaldehydebisulfite will not result due to an acidic or alkaline environment being created within the mixture.

In typical production of a liquid form of this invention, the following parameters should be considered preferable but not essential. If dry sodium formaldehydebisulfite is to be used it should be of photographic grade which has typically less than 0.1% free formaldehyde and less than 0.1% uncombined sodium bisulfite and of powder form. If the sodium formaldehydebisulfite is to be formed by reaction, then 35–38% formaldehyde solution with no more than 15% methanol can be reacted with photographic grade, powdered or granular sodium bisulfite. Water should be completely deionized and have a pH of 6.5 to 7.5. The final solution is to be clear, colorless and free from suspended or precipitated matter. Mixing and filling equipment may desirably be fabricated from stainless steel or polyvinyl chloride. The liquid product can be packaged and stored in polyethylene containers with polyethylene or polypropylene closures.

The relative instability of formaldehydebisulfites in alkaline media does not recommend the use of the in situ reaction of formaldehyde solution with alkali sulfites, and the presence of amounts of hydroxide ions ($O_H{}^-$) equimolar to the amounts of alkali metal formaldehydebisulfites could be detrimental to aquatic life in treated waters due to an increase in pH which might result.

As previously indicated, the reaction mechanism and reaction products are not completely understood in the reaction of alkali metal formaldehydebisulfite with chloramines, chlorine and ammonia in water. However, research indicates that the reactants react on a one to one molecular basis and this observation is utilized in formulating the amount of alkali metal formaldehydebisulfite in a dry or solution form which is required for a specified amount of pollutant found in the water to be treated. Accordingly, as minimum effective quantities, alkali metal formaldehydebisulfite must be present in an amount at least equal to the greater of the quantity required to react on a one to one molecular basis with the stoichiometric amount of ammonia, the stoichiometric amount of monochloramine, the stoichiometric amount of dichloramine or the stoichiometric amount of chlorine in the form of hypochlorites present in the water to be treated. It is naturally desirable, however, that the neutralizing agent be present in excess. In a preferred embodiment of the invention, the alkali metal formaldehydebisulfite is sodium formaldehydebisulfite added in the amount at least equal to the greater of the quantity required to react on a one to one molecular basis with a reactant selected from the group consisting of 4 times the stoichiometric amount of ammonia, 12 times the stoichiometric amount of monochloramine, 10 times the stoichiometric amount of dichloramine and 12 times the stoichiometric amount of chlorine in the form of hypochlorites present in the water to be treated.

The invention is further exemplified with reference to the following research examples investigating the parameters of the alkali metal formaldehydebisulfites for use in aquaculture and the efficacy for neutralizing chloramines, chlorine and ammonia from water to provide a safe treatment program for aquatic life in culture water.

EXAMPLE 1

Research was conducted to investigate the reaction between sodium formaldehydebisulfite (hereinafter referred to as "SFB") and ammonia as represented by the following equation:

$$SFB + NH_3 \rightarrow ????$$

To test this reaction I prepared ammonia standards from ammonium chloride and used the standard method of measuring for ammonia with an Orion 901 Ionalyzer connected to a chart recorder and an ammonia specific-ion-electrode (hereinafter referred to as "SIE"). Two working solutions of SFB, #1 SFB solution (120.85 g/L) and #2 SFB solution (241.72 g/L) were prepared for use in the subsequent reaction studies. The standard ammonia solutions were made so that upon addition of 1 mL of 10N sodium hydroxide (NaOH) concentrations of 0.5 ppm, 1.0 ppm and 2.0 ppm (as $NH_3$) were produced. One-hundred milliliters of each standard ammonia solution were pipetted, in turn, into 150-mL Fleakers, a Teflon-coated stirring bar was placed in the Fleaker and gentle stirring was started. The prepared and standardized SIE was placed into the solution and when a stable baseline was achieved on the recorder, 1.0 mL of the NaOH solution was pipetted into the solution. As soon as a stable reading was obtained on the instrument and a new, stable baseline was achieved on the recorder then an excess (1.0 mL) of the #1 SFB solution was added and any change in the measured ammonia concentration was tracked on both the instrument and the recorder with instrument readings being noted on the recorder chart at arbitrary intervals.

The results of the chemical tests suggest that the reaction between ammonia and SFB even at high pH's is a concentration dependent, second order reaction. As such the reaction time is limited by the concentrations of both reactants. This means that very low concentrations of ammonia (less than 0.5 ppm) will exhibit very long reaction times. In my tests a 10% reduction in the initial concentration (0.5 to 0.45 ppm) took 15 minutes as illustrated in Table 1. A similar percentage reduction took only 3.68 minutes at an initial concentration of 1.0 ppm with a change in rate at 15.26 minutes (concentration of approximately 0.65 ppm) as shown in Table 2. With reference to Table 3, and with a 2.0 ppm initial ammonia concentration, a 10% reduction was achieved at 4.88 minutes with a rate change at 14.1 minutes (concentration of approximately 1.40 ppm) and an approximate 50% reduction (1.06 ppm) was achieved at 33.16 minutes. In each case, subsequent additions of the #1 SFB solution resulted in an increase in the reaction rate.

TABLE 1.

| Time: | Conc. (ppm): |
|---|---|
| 0:00.00 | 0.500 |
| 0:05.08 | 0.491 |
| 0:07.06 | 0.484 |
| 0:09.04 | 0.476 |
| 0:11.06 | 0.470 |
| 0:13.00 | 0.461 |
| 0:15.00 | 0.450 |

TABLE 2.

| Time: | Conc. (ppm): |
|---|---|
| 0:00.00 | 1.00 |
| 0:02.00 | 0.938 |
| 0:03.68 | 0.900 |
| 0:05.96 | 0.833 |
| 0:06.96 | 0.810 |
| 0:08.00 | 0.788 |
| 0:10.50 | 0.729 |
| 0:14.40 | 0.656 |
| 0:23.10 | 0.590 |
| 0:32.80 | 0.531 |

TABLE 3.

| Time: | Conc. (ppm): |
|---|---|
| 0:00.00 | 2.00 |
| 0:02.00 | 1.97 |
| 0:04.88 | 1.80 |
| 0:07.40 | 1.62 |
| 0:11.12 | 1.46 |
| 0:17.00 | 1.31 |
| 0:23.70 | 1.18 |
| 0:33.16 | 1.06 |
| 0:33.52 | Second Addition of SFB |
| 0:34.98 | 1.00 |
| 0:36.20 | 0.955 |
| 0:39.42 | 0.861 |
| 0:41.80 | 0.800 |
| 0:43.28 | 0.770 |
| 0:44.00 | Third Addition of SFB |
| 0:45.06 | 0.697 |
| 0:46.76 | 0.627 |
| 0:48.98 | 0.565 |
| 0:51.78 | 0.508 |
| 0:56.18 | 0.457 |
| 0:56.98 | 0.450 |

EXAMPLE 2

Additional tests were conducted to confirm the reaction between SFB solutions and ammonia. Inthe first test, an ad libidum solution of ammoniacal silver nitrate was prepared by dissolving an unweighed quantity of silver nitrate ($AgNO_3$) in just enough 6.0N ammonium hydroxide to produce a clear colorless solution free of precipitate. Since it is known that any reduction in the slight excess of ammonia in this solution will result in the precipitation of an insoluble silver compound, it was assumed that just such a precipitate would form if SFB or its solutions were added to the solution. Side-by-side controls were used to confirm that any reaction was not due to some other variable such as loss of ammonia from the solution to the atmosphere. Identical test tubes were used. In each of six tubes, 15 drops of the ammoniacal silver nitrate solution were added. Then 10 drops of totally deionized water were added to each tube and each tube, in turn, was swirled to mix. In three of the tubes, 25 drops of #2 SFB solution was added to each. In the remaining tubes, 25 drops of totally deionized water was added to each. Each tube was swirled to insure mixing of the contents, and allowed to stand to observe any visible changes.

In the test series of the ammoniacal silver nitrate with the SFB solution the three tubes without added SFB solution showed no reaction during the test which was terminated after 1 hour. The three tubes with added SFB solution showed an immediate reaction (within 30 seconds); a white precipitate was formed which coagulated readily upon additional swirling of the tubes. In addition, the SFB-containing tubes exhibited only a slight musty odor while the untreated tubes exhibited a noticeably stronger and distinct ammonia odor. This test showed that the SFB reacted to remove the ammonia allowing the formation of an insoluble silver precipitate compound.

EXAMPLE 3

In a test series further examining the ammonia and SFB reaction, 25 drops of 1.0 M cupric sulfate solution was added to each of six identical test tubes. Next, 25 drops of totally deionized water was added to each tube and each tube was swirled to insure mixing of the contents. Next, 15 drops of 6.0N ammonium hydroxide solution was added to each tube to produce a solution of ammoniacal cupric sulfate. As with the ammoniacal silver nitrate, any dissipation or removal of ammonia from this solution will result in the precipitation of an insoluble copper compound Finally, 50 drops of #2 SFB solution was added to three of the six tubes, and 50 drops of totally deionized water were added to the remaining three tubes. Each tube was swirled to mix the contents.

The series of tests with ammoniacal cupric sulfate showed essentially the same results as the test with ammoniacal silver nitrate. The color change of the solutions and the color of the precipitate were more dramatic. In the SFB-containing tubes, the clear, bright blue solution became turbid within 5 to 7 minutes and within 2 hours the color of the solution changed to a very pale blue and a copious amount (equivalent to approximately ⅓ the volume of the total liquid in the tube) of blue-green precipitate had formed. The control tubes exhibited no color changes or precipitate formation during the test which terminated after 4 hours. As with the previous test series, only a slight musty odor was detectable in the SFB-containing tubes while in the control tubes a strong and distinct ammonia odor was detectable.

The same test parameters were employed in which two different solutions were substituted for the #2 SFB solution. These two solutions were: (1) an SFB solution (hereinafter "#3 SFB solution") in which equal volumes of sodium bisulfite having a 1 M concentration as sulfur dioxide and a 1 M formaldehyde solution were mixed; and (2) a potassium formaldehydebisulfite (hereinafter "KFB") solution in which equal volumes of potassium metabisulfite ($K_2S_2O_5$) having a 1 M concentration as sulfur dioxide and a 1 M formaldehyde solution were mixed. Both solutions were designed to be 0.5 M in the respective alkali metal formaldehydebisulfite (i.e., sodium in the former and potassium in the latter solution). When tested in a manner equivalent to that of the #2 SFB solution above using 90 drops of each solution, identical results were obtained with solutions of ammoniacal cupric sulfate.

In an additional test series, a combination solution of equal volumes of #3 SFB solution and KFB solution were substituted for the #2 SFB solution at the rate of 45 drops of each of the #3 SFB and KFB solutions, added together, to solutions of ammoniacal cupric sulfate. This combination solution reacted in an identical manner as cited above for the #2 SFB solution.

EXAMPLE 4

In the next test series, 15 drops of 6.0 N ammonium hydroxide was added to each of six test tubes. Next, 3 drops of bromthymol blue, U.S.P. test solution used as a pH indicator, was added to each tube, and each tube was swirled to mix the contents. Each solution turned a characteristic blue color indicating an alkaline pH. Next, 50 drops of #2 SFB solution was added to three of the tubes and 50 drops of totally deionized water the the remaining three tubes. Each tube was swirled to insure mixing of the contents and each tube was stoppered with tightly fitting silicone rubber stoppers and allowed to stand to observe any changes in the color of the solutions. One tube containing the added SFB solution and one tube with just added water was periodically opened at intervals of every 15 minutes for the first 2 hours, then every hour for 6 additional hours, and smelled to test for the odor of ammonia. The other four tubes remained unopened throughout the entire 8 hours of the test.

Throughout the test, all tubes retained the color indicating an alkaline pH. In the control tubes, the stoppers were easily removed indicating no reduction in the atmospheric pressure within the tubes. In the SFB-containing tubes, the stoppers in the two tubes which remained unopened during the test had been pulled noticeably deeper into the mouth of the tube to a depth of 0.5 to 0.7 centimeters greater than the stoppers in the other four tubes. Greater effort was required to extract the stoppers from these two tubes. In the one SFB-containing tube which was periodically opened for odor testing there was no noticeable difference in the depth of the stopper or in the effort required to extract it at the termination of the test. There was a clearly detectable difference in ammonia odor in the three SFB-containing tubes compared to the odor in the control tubes at the termination of the test. The reduction of the atmospheric pressure in the control tubes is indicative of the consumption of ammonia, which ordinarily has an appreciable vapor pressure at room temperature. The initial odor of each tube was the characteristic pungent odor typical of ammonia solutions.

EXAMPLE 5

Research was conducted to investigate the reaction between sodium formaldehydebisulfite (hereinafter referred to as "SFB") and monochloramine as represented by the following equation:

$$SFB + H_2NCl \rightarrow ????$$

The experiment was designed so that any reduction in either chlorine or ammonia concentrations or both could be observed, rather than speculate as to the nature of the reaction products. I prepared a standard monochloramine solution from 28% ammonia solution and sodium hypochlorite solution so that the resulting solution contained 1 ppm monochloramine ($H_2NCl$). One-hundred milliliters of this solution were pipetted into a 150-mL Fleaker and prepared as for the ammonia tests given in prior Example 1 except no NaOH solution was added. When an instrument reading of 1.00 ppm was achieved, 1.0 mL of the #1 SFB solution was added and any change was tracked on both the instrument and the recorder with instrument readings being noted on the recorder chart at arbitrary intervals. In the chloramine reaction test, the readings as shown in Table 4 indicated an increase from the "set" meter reading of 1.00 ppm to 1.46 ppm at 3.98 minutes at which time the measured concentration of ammonia started decreasing. This is consistent with a first order dechlorination reaction followed by reaction with ammonia. As in previous Example 1, addition of more of the SFB solution resulted in an increased reaction rate. From the first point of recorded decrease in the ammonia concentration to the point of the second addition of SFB solution, the rate was equivalent to approximately 0.91% decrease in ammonia per minute. From the second addition to the third addition of SFB solution, the rate was approximately 4.7% decrease per minute, and from the third addition, the rate was approximately 7.4% decrease per

TABLE 4.

| Time: | Conc. (ppm): |
|---|---|
| 0:00.00 | 1.00 |
| 0:03.98 | 1.46 |
| 0:05.55 | 1.44 |
| 0:07.19 | 1.42 |
| 0:08.53 | 1.40 |
| 0:10.00 | 1.38 |
| 0:11.75 | Second Addition of SFB |
| 0:12.15 | 1.25 |
| 0:13.30 | 1.20 |
| 0:13.98 | 1.15 |

TABLE 4.-continued

| Time: | Conc. (ppm): | |
|---|---|---|
| 0:14.72 | 1.10 | |
| 0:15.45 | 1.05 | |
| 0:16.45 | 1.00 | |
| 0:17.55 | 0.950 | |
| 0:18.15 | 0.900 | |
| 0:19.80 | 0.850 | |
| 0:22.85 | 0.750 | |
| 0:27.09 | 0.650 | Third Addition of SFB |
| 0:28.75 | 0.600 | |
| 0:29.55 | 0.500 | |
| 0:31.84 | 0.400 | |
| 0:35.51 | 0.300 | |
| 0:36.80 | 0.275 | |

EXAMPLE 6

Research was conducted to investigate the reaction of SFB solutions with tap water, conditioned (aged) aquarium water, fresh synthetic sea water, and conditioned (aged) synthetic sea water. This was done by adding 25-mL portions to equal portions of each water type and comparing to 25-mL portions of the untreated water type mixed with 25 mL of deionized water in matched Nessler's tubes (50 mL).

The same kind of comparison was made using a 25-ml sample of a commercially available all purpose water conditioner.

There were no discernible differences between the reference tubes and the test tubes in the experiments with the different water types and the #1 SFB solution. This was also true of the tests with the all purpose water conditioner instead of water. In the tests with the all purpose water conditioner there were no discernible differences after 21 days.

EXAMPLE 7

Research was conducted to investigate the effects of SFB solutions on seven different species of freshwater fishes. The experimental design for these tests were essentially the same throughout except for the number and size of each species.

Two species were captured by seining and the other five species were purchased from a tropical fish wholesaler. The species chosen represented "typical" families of freshwater aquarium fishes and included cyprinids, poeciliids, callichthyids, cichlids, characids, centrarchids, and ictalurids. All fishes were quarantined for a minimum of 14 days before being used in any tests, and no species was used if any diseased or dying individuals were observed among their population until no disease or deaths had been observed for at least 10 days.

The test procedure for all species was the same. Three 4 liter beakers were filled with approximately 3,000 mL of the water all from the same source. Aeration was provided by a fine porosity airstone adjusted by valve so that the fishes were not required to "fight" a current in the beaker. One of the three beakers was a control and had no SFB solution added. A second beaker had 0.4 mL of the #1 SFB solution added, which represented a double "normal" dose of the active agent. A third beaker had 4.0 mL added, which represented 10 times a "normal" dose.

Five of each species of cyprinid (gold barbs, *Barbus semifasciolatus*), poeciliid (red-velvet swordtails, *Xiphophorus helleri*), callichthyid (albino peppered catfish, *Corydoras paleatus*), cichlid (silver angelfish, *Pterophyllum emeeki*), and characid (serpae tetra, *Hyphessobrycon callistus serpae*) were used in each beaker with one species per test. The cyprinids, characids, and cichlids were tested for 24 and 48-hours with two separate tests per species with different individual fishes used in each test. The other species were each tested for 24 hours. The centrarchids (longear sunfish, *Lepomis megalotis*) and ictalurids (slender madtoms, *Noturus exilis*) were used at the rate of only one fish per beaker and then only the 24-hour series were run for each species.

No deaths occurred with any of the species tested when SFB solutions were added to aged aquarium water. This was true for both the 24 and 48-hour tests.

EXAMPLE 8

Research was conducted to investigate the effectiveness of SFB for protecting fishes against toxic levels of chlorine and chloramines.

Using municipal tap water, I tested the effectiveness of the #1 SFB solution for protecting silver angelfishes against the toxic effects of chlorine and chloramines. The same three-beaker set-up was used as in the previous example, except that unconditioned tap water was added to the beakers after the water was allowed to flow from the tap for a full ten minutes) Just as in the prior tests, 5 angelfishes were added to each beaker. One beaker served as a control with no SFB solution added. The second and third beakers each received a 0.4 mL dose of #1 SFB solution. The fishes were observed during the first four hours and then at the 8th hour and at the 24th hour on termination of the test. The water was also sampled for total and combined chlorine testing. Dead fish were removed as found. The test procedure was carried out twice in its entirety.

The municipal tap water utilized during the testing was found to have a total chlorine content of 2.5 ppm and a combined chlorine content of 2.0 ppm.

The experiment indicated that the #1 SFB solution protected the test fish, not only from death, but also from the stressful effects of the new water. Within 1 hour, the fish in the control beakers having no SFB solution had assumed stress coloration characterized by darkening of their normal barred pattern. Within 2 hours, 40% of the fish in the control beakers were judged to have lost the ability for normal swimming although they still responded to a sharp tap on the side of the beaker. At the conclusion of the tests, 50% of the fish (3 out of 5 in test #1 and 2 out of 5 in test #2) in the control beakers were dead. There were no mortalities in the beakers to which SFB solutions had been added. At 1 hour, the beakers were all tested for total chlorine. The control beakers showed no change in chlorine content and the beakers containing SFB showed no chlorine presence. There was still residual chlorine in the control beakers at the conclusion of the tests after 24 hours.

EXAMPLE 9

An investigation was undertaken to determine the effect, if any, of overdose quantities of SFB on aquatic life in marine water.

Thirty-six specimens of the pink-tipped anemone, *Condylactus giantea* were distributed among four different 20-gal aquariums. The specific gravities of each tank were adjusted so that the first tank was 1.016, the second 1.020, the third 1.025, and the fourth 1.030. The anemones were allowed to acclimate to their tanks for 10 days. Ten-milliliter portions of the #1 SFB solution were pipetted, by bulb, onto the opened oral discs of three anemones in each tank to observe the immediate reaction to the solution in excess and the long-term reaction to the solution in the tanks. Care was exercised to keep from touching the animal with the tip of the pipette. After the #1 SFB solution was added, each tank was observed for the first hour and then at 8 and 24 hours and then ad lib. for the next three days.

I was unable to elicit any reaction from the anemones by pipetting the #1 SFB solution onto their oral discs. However, in separate tests with deionized water substituted for #1 SFB solution, all of the anemones showed some reaction (6 of 6) but only 2 of the animals actually closed up in response to the test. No deaths occurred among the population of test animals.

EXAMPLE 10

Research was conducted to investigate the long-term effectiveness of SFB for protecting fishes against toxic levels of chloramines, chlorine and ammonia and the long-term effect of overdose levels of SFB.

(1) Four, 20-gallon "community" aquariums were set up with five silver angels, five gold barbs, six serpae tetras, four red-velvet swordtails, and one albino pepperred catfish per tank. Each tank was given approximately a two-thirds water change daily, except on the weekends. One tank (#7) was dosed with 5 mL of a commercially available all-purpose water conditioner after fresh tap water, without any temperature adjustment, had been added. A second tank (#8) was dosed with 5 mL of the same all-purpose water conditioner before the tap water was added. A third tank (#10) was dosed with 10 mL of the #1 SFB solution for the first 13 days of the test and then, for the remaining 17 days, with 5 mL of #2 SFB solution before the tap water was added. The fourth tank (#11) was dosed in the same manner as the third tank, first with 10 mL of the #1 SFB solution and then with 5 mL of #2 SFB solution after the tap water was added. This test was conducted for a total of 30 days for a total of 22 water changes on each aquarium.

(2) In eleven additional 20-gallon aquariums various species and numbers were tested by adding 10.0 mL of the #1 SFB solution each day, except weekends, for 23 days for a total of 17 additions of #1 SFB solution and then by adding 5 mL of #2 SFB solution each day, except weekends, for 17 days for a total of 13 additions of #2 SFB. During this 40-day period, no water was added or removed from the eleven test aquariums.

The original aquarium census for these eleven aquariums was as follows:

Tank #1 one 6" male bluegill sunfish (*Lepomis macrochirus*)
Tank #2 one 6" male longear sunfish
Tank #3 one 5" female longear sunfish+one 4" slender madtom
Tank #4 fourteen 1" to 1½" gold barbs
Tank #5 five 1" to 1½" gold barbs+one 1" serpae tetra
Tank #6 five 1½" silver angels
Tank #12 two 3" slender madtoms
Tank #13 one 7" green sunfish (*Lepomis cyanellus*)
Tank #14 ten 1" to 1½" gold barbs
Tank #16 nine 1½" silver angels
Tank #18 six 1½" silver angels.

The use, at first of 10 mL of the #1 SFB solution, and subsequently 5 mL of #2 SFB solution, resulted in exactly the same quantities of SFB being added to each of the test aquariums. All of the test tanks were fed daily, ad lib, except on weekends. All aquariums in these two tests were filtered only with single under gravel filters. The substrate in all test aquariums was ¼"×⅛" red flint filter gravel at a depth of 3".

In the water changing tests with all-purpose water conditioner and the SFB solutions, one fish (red-velvet swordtail) died in tank #11 and one fish died in tank #10 (red-velvet sword tail). In the all-purpose water conditioner tanks, one silver angel died in tank #7. These deaths were not considered significant. The general health and appearance of all of the fishes were good. All of the fish were robust and ate with gusto when food was offered.

In the daily-dosed tanks which had no water changes or water additions, three (33⅓%) angels died in tank #1. There were no other deaths. All of the fishes ate with gusto and were robust and healthy. All fishes exhibited normal behavioral patterns such as begging, displaying, schooling, and normal coloration.

EXAMPLE 11

Research was conducted to investigate the effect of pH on the reaction time of deamination in synthetic sea water when using SFB solution.

In these tests, an ammonia specific-ion electrode (SIE) and direct-reading meter were employed to track the change in the relative free ammonia concentration over time. The physical parameters for these tests include specific gravity equal to 1.020 as determined by refractometer; temperature equal to 20° +/−1° C.; and total ammonia concentration equal to 1.00 ppm for one series of tests and 5.00 ppm for a second series of tests. The tests were conducted in covered beakers containing 1 liter of the test solution. The solutions were stirred continuously during the tests. The ammonia SIE and meter were used in a direct reading mode so that the electrode responded only to the actual free ammonia in the solutions. For those tests in which the total ammonia was 1.00 ppm, the meter was given a "set concentration" equal to 1.00 and 5.00 for the 5.00 ppm tests. The meter then tracked the actual, free ammonia in the solution and displayed a digital reading proportionate to the changes which occurred over time as the reaction progressed.

Results of the effect on the neutralization reaction of varying pH's in synthetic seawater and varying initial concentration of ammonia are presented in Tables 5-11. This study reflects that the reaction favors an increase in pH level and also favors higher initial concentrations of ammonia.

TABLE 5.

| | pH = 6.000: | |
|---|---|---|
| Time: | Relative Conc. (ppm): | Percent Change: |
| 0:00.00 | 1.00 | 0.00 |
| 0:01.00 | 0.993 | 0.79 |
| 0:02.00 | 0.992 | 0.80 |
| 0:05.00 | 0.985 | 1.50 |
| 0:10.00 | 0.974 | 2.60 |
| 0:20.00 | 0.953 | 4.70 |
| 0:30.00 | 0.935 | 6.50 |
| 1:00.00 | 0.889 | 11.10 |
| 2:00.00 | 0.825 | 17.50 |
| 4:00.00 | 0.728 | 27.20 |
| 5:00.00 | 0.712 | 28.80 |
| 6:00.00 | 0.683 | 31.70 |

TABLE 6.

pH = 7.000:

| Time: | Relative Conc. (ppm): | Percent Change: |
|---|---|---|
| 0:00.00 | 1.00 | 0.00 |
| 0:01.00 | 0.976 | 2.40 |
| 0:02.00 | 0.951 | 4.00 |
| 0:05.00 | 0.898 | 10.20 |
| 0:10.00 | 0.878 | 12.20 |
| 0:20.00 | 0.781 | 21.90 |
| 0:30.00 | 0.715 | 28.50 |
| 1:00.00 | 0.578 | 42.20 |
| 2:00.00 | 0.501 | 49.90 |
| 3:00.00 | 0.387 | 61.30 |
| 4:00.00 | 0.371 | 62.90 |
| 6:07.00 | 0.353 | 64.70 |

TABLE 7.

pH = 8.000:

| Time: | Relative Conc. (ppm): | Percent Change: |
|---|---|---|
| 0:00.00 | 1.00 | 0.00 |
| 0:01.00 | 0.970 | 3.00 |
| 0:02.00 | 0.908 | 9.20 |
| 0:05.00 | 0.779 | 22.10 |
| 0:10.00 | 0.631 | 36.90 |
| 0:20.00 | 0.463 | 53.70 |
| 0:30.00 | 0.384 | 61.60 |
| 1:00.00 | 0.329 | 67.10 |
| 2:00.00 | 0.296 | 70.40 |
| 4:00.00 | 0.291 | 70.90 |

TABLE 8.

pH = 9.000:

| Time: | Relative Conc. (ppm): | Percent Change: |
|---|---|---|
| 0:00.00 | 1.00 | 0.00 |
| 0:01.00 | 0.915 | 8.50 |
| 0:02.00 | 0.832 | 16.80 |
| 0:05.00 | 0.691 | 30.90 |
| 0:10.00 | 0.555 | 44.50 |
| 0:20.00 | 0.477 | 52.30 |
| 0:30.00 | 0.441 | 55.90 |
| 1:00.00 | 0.367 | 63.30 |
| 2:05.00 | 0.298 | 70.20 |
| 3:19.00 | 0.268 | 73.20 |

TABLE 9.

pH = 6.000:

| Time: | Relative Conc. (ppm): | Percent Change: |
|---|---|---|
| 0:00.00 | 5.00 | 0.00 |
| 0:01.00 | 4.96 | 0.80 |
| 0:02.00 | 4.93 | 1.40 |
| 0:05.00 | 4.80 | 4.00 |
| 0:10.00 | 4.69 | 6.20 |
| 0:20.00 | 4.41 | 11.80 |
| 1:00.00 | 3.90 | 22.00 |
| 2:00.00 | 3.46 | 30.80 |
| 3:00.00 | 2.94 | 41.20 |
| 4:00.00 | 2.61 | 47.80 |
| 5:00.00 | 2.55 | 49.00 |
| 6:00.00 | 2.41 | 51.80 |
| 6:40.00 | 2.39 | 52.20 |
| 7:00.00 | 2.32 | 53.60 |

TABLE 10.

pH = 7.000:

| Time: | Relative Conc. (ppm): | Percent Change: |
|---|---|---|
| 0:00.00 | 5.00 | 0.00 |
| 0:01.00 | 4.87 | 2.60 |
| 0:02.00 | 4.80 | 4.00 |
| 0:05.00 | 4.68 | 6.40 |
| 0:10.00 | 4.58 | 8.40 |
| 1:00.00 | 4.54 | 9.20 |
| 2:00.00 | 4.50 | 10.00 |

TABLE 11.

pH = 8.000:

| Time: | Relative Conc. (ppm): | Percent Change: |
|---|---|---|
| 0:00.00 | 5.00 | 0.00 |
| 0:01.00 | 4.85 | 3.00 |
| 0:02.00 | 4.73 | 5.40 |
| 0:05.00 | 4.38 | 12.40 |
| 0:10.00 | 3.91 | 21.80 |
| 0:20.00 | 3.35 | 33.00 |
| 0:30.00 | 3.23 | 35.40 |
| 2:00.00 | 3.00 | 40.00 |

EXAMPLE 12

Research was conducted to determine the effectiveness of SFB solution to control losses of live marine animals due to high total free ammonia levels as typically encountered in shipping containers.

In these tests a variety of marine fishes and invertebrates were collected in Nazareth Bay in St. Thomas (U.S. Virgin Islands). These animals were packed in fresh seawater treated with the #2 SFB solution dosed at the rate of 4.93 mL/10 gallons of seawater in sealed polyethylene bags. The bags were approximately 1.5 liter in capacity. Each bag held approximately 500 mL of the treated seawater along with the animals and 1 liter of pure oxygen. Each bag was placed inside another bag and sealed. The bags were placed in expanded styrene foam boxes inside corrugated cardboard boxes. Four such boxes containing a total of 65 bags of live animals were then shipped from St. Thomas, via scheduled common air carrier, to Miami, Fla., thence to Kansas City, Mo. The total shipping time was approximately 48 hours. No untreated controls were used in this test.

It is well known among aquaculturists that marine fishes and invertebrates suffer from and succumb to ammonia build-up in shipping bags containing untreated water and that significant losses can be expected. However, there were no deaths of any of the marine fishes and invertebrates shipped in #2 SFB treated-seawater. The health and condition of the fishes and invertebrates upon arrival and subsequent removal to holding aquaria was contrary to what would have occurred if no provision for ammonia control had been made.

EXAMPLE 13

A test was performed in which reduction in the measured ammonia concentration was measured over time using 0.117 mL of the KFB solution added to 500 mL of a hard water sample having a pH 8.0 at a temperature of 19.1° with a total ammonia concentration of 1.00 ppm. The results are shown in Table 12.

TABLE 12.

| Time: | Conc. (ppm): |
| --- | --- |
| 0:00.00 | 1.00 |
| 0:01.00 | 0.892 |
| 0:02.00 | 0.837 |
| 0:05.00 | 0.759 |
| 0:10.00 | 0.722 |
| 0:20.00 | 0.683 |

A 31.7% reduction in the measured ammonia concentration, at the end of 20 minutes, was demonstrated by the test.

EXAMPLE 14

Research was conducted to determine the effectiveness of using a dry mixture form of SFB in place of SFB solutions to neutralize aqueous free chlorine (hypochlorites) and ammonia.

A dry SFB mixture consisting of 58.995% sodium formaldehydebisulfite and 41.005% fine blending salt (sodium chloride) was used, volumetrically, at the same rate as for #2 SFB solution (i.e., 1 teaspoon/10 gallons) to treat two 20-gallon (75 liters) aquariums containing 17 gallons (64 liters) each of aged freshwater. The aged water had been pooled from water taken from four aquariums in which a mixed population of fishes had been maintained for 8 months. In the first aquarium, a quantity of commercial bleach was added to achieve a concentration of 2 ppm total chlorine. In the second aquarium, a quantity of ammonium chloride solution was added to achieve a concentration of 1 ppm total ammonia. Into each aquarium, 8.4 mL of the dry SFB mixture was measured by graduated cylinder and added without mixing. Each aquarium was equipped with an air diffuser to provide mixing and circulation of the water.

The pH and temperature of each aquarium was noted at the beginning and end of the tests. The initial pH and final pH remained the same at 6.8. The initial temperatures were 21.2° and the final temperatures were 21.4° after 6 hours. No animals were maintained in the aquariums during the tests.

Samples of 100 mL were drawn from each aquarium at the start of the test and at time intervals of 1 hour, 2 hours, 3 hours and 6 hours for determination of the concentrations of the target toxicants.

TABLE 13.

| Time: | Chlorine Conc. (Aq. #1): | Ammonia Conc. (Aq. #2): |
| --- | --- | --- |
| 0:00.00 | 2.0 ppm | 1.00 ppm |
| 1:00.00 | 0.00 ppm | .608 ppm |
| 2:00.00 | 0.00 ppm | .516 ppm |
| 3:00.00 | 0.00 ppm | .401 ppm |
| 6:00.00 | 0.00 ppm | .349 ppm |

The results were consistent with and comparable to those obtained with #2 SFB solution. Thus, dry or solution formulations proved effective to neutralize the toxicants.

As indicated, this invention provides a one step method for timely neutralizing chloramines, chlorine and ammonia from saline and fresh waters for use in aquaculture. It is nontoxic to fishes, aquatic invertebrates, marine and freshwater algaes, and to aquatic plants. It does not cloud the culture water or react with dissolved oxygen in the culture water. It functions effectively throughout the pH range of 6.0 to 9.0 of waters in which most aquatic life is found. It can be combined with known water conditioning chemicals and with known therapeutic agents used in aquaculture.

From the foregoing it will be seen that this invention is one well adapted to attain all the ends and objects hereinabove set forth, together with the other advantages which are obvious and which are inherent to the invention.

It will be understood that certain features and subcombinations are of utility and may be employed without reference to other features and subcombinations. This is contemplated by and is within the scope of the claims.

Since many possible embodiments may be made of the invention without departing from the scope thereof, it is understood that all matter herein set forth or shown in the research examples is to be interpreted as illustrative and not in a limiting sense.

Having thus described my invention, I claim:

1. A process for neutralizing a pollutant selected from the group consisting of chloramines, chlorine, ammonia and mixtures thereof in aquaculture water having a pH in the range of about 6.0 to 9.0 by adding to said water an alkali metal formaldehydebisulfite selected from the group consisting of sodium formaldehydebisulfite and potassium formaldehydebisulfite in an amount sufficient to render said pollutant nontoxic to aquatic life in said water.

2. The process as in claim 1 wherein said alkali metal formaldehydebisulfite is sodium formaldehydebisulfite.

3. The process as in claim 1 wherein said alkali metla formaldehydebisulfite is added in the amount at least equal to the greater of the quantity required to react on a one to one molecular basis with the stoichiometric amount of pollutant present in the water wherein said pollutant is selected from the group consisting ammonia ($NH_3$), monochloramine ($NH_2Cl$), dichloramine ($NHCl_2$), chlorine in the form of hypochlorus acid (HOCl) and hypochlorites ($OCl^-$), and mixtures thereof.

4. The process as in claim 3 wherein said alkali metal formaldehydebisulfite is added in the amount at least equal to the greater of the quantity required to react on a one to one molecular basis with a reactant selected from the group consisting of 4 times the stoichiometric amount of ammonia ($NH_3$), 12 times the stoichiometric amount of monochloramine ($NH_2Cl$), 10 times the stoichiometric amount of dichloramine ($NHCl_2$), 12 times the stoichiometric amount of chlorine in the form of hypochlorus acid (HOCl) and hypochlorites ($OCl^-$) present in said water, and mixtures thereof.

5. The process as in claim 1 wherein said culture water is free from nontarget oxidizing pollutants.

6. The process as in claim 5 wherein said nontarget oxidizing pollutants are selected from the group consisting of permanganates, peroxides, dichromates, arylmethane dyes, and mixtures thereof.

7. The process as in claim 1 wherein said alkali metal formadehydebisulfite is combined with inert material selected from the group consisting of diluents, carriers, excipients, lubricants, disintegrants, colorants, and mixtures thereof.

8. The process as in claim 7 wherein said diluents and carriers are selected from the group consisting of salt, sodium sulfate, potassium chloride, starch, sugars, clays, calcium sulfate, and mixtures thereof.

23

9. The process as in claim 7 wherein said excipients are selected from the group consisting of cellulose gum, povidone, starches, and mixtures thereof.

10. The process as in claim 7 wherein said lubricants are selected from the group consisting of calcium stearate, magnesium stearate, paraffin wax, stearic acid, and mixtures thereof.

11. The process as in claim 7 wherein said disintegrants are selected from the group consisting of cross-linked povidone, sodium bicarbonate/citric acid, and mixtures thereof.

12. The process as in claim 7 wherein said colorants is acriflavine.

13. A process for neutralizing a pollutant selected from the group consisting of chloramines, chlorine, ammonia and mixtures thereof in aquaculture water having a pH in the range of about 6.0 to 9.0 by adding reactants to said water to produce an alkali metal formaldehydebisulfite selected from the group consisting of sodium formaldehydebisulfite and potassium formaldehydebisulfite in an amount sufficient to render said pollutant nontoxic to aquatic life in said water.

14. The process as in claim 13 wherein said reactants comprise a formaldehyde and water solution and a sodium bisulfite and water solution combined to produce sodium formadehydebisulfite.

15. The process as in claim 14 wherein said formaldehyde comprises at least 9% by weight of said formaldehyde and water solution.

16. The process as in claim 14 wherein said sodium bisulfite comprises at least 33% by weight of said sodium bisulfite and water solution.

17. A process for neutralizing ammonia and a pollutant selected from the group consisting of chloramines, chlorine, and mixtures thereof in aquaculture water having a pH in the range of about 6.0 to 9.0 by adding to said water an alkali metal formaldehydebisulfite selected from the group consisting of sodium formaldehydebisulfite and potassium formaldehydebisulfite in an amount sufficient to render said ammonia and said pollutant nontoxic to aquatic like in said water.

18. The process as in claim 17 wherein said alkali metal formaldehydebisulfite is sodium formaldehydebisulfite.

19. The process as in claim 17 wherein said alkali metal formaldehydebisulfite is added in the amount at least equal to the greater of the quantity required to react on a one to one molecular basis with the stoiciometric amount of ammonia ($NH_3$) present in the water and the stoichiometric amount of said pollutant present in the water wherein said pollutant is selected from the group consisting monocloramine ($NH_2Cl$), dichloramine ($NHCl_2$), chlorine in the form of hypochlorus acid (HOCl) and hypochlorites ($OCl^-$), and mixtures thereof.

20. The process as in claim 19 wherein said alkali metal formaldehydebisulfite is added in the amount at least equal to the greater of the quantity required to react on a one to one molecular basis with a reactant selected from the group consisting of 4 times the stoichiometric amount of ammonia ($NH_3$), 12 times the stoichiometric amount of monochloramine ($NH_2Cl$), 10 times the stoichiometric amount of dichloramine ($NHCl_2$), 12 times the stoichiometric amount of chlorine in the form of hypochlorus acid (HOCl) and hypochlorites ($OCl^-$) and mixtures thereof present in said water.

24

21. The process as in claim 17 wherein said culture water is free from nontarget oxidizing pollutants.

22. The process as in claim 21 wherein said nontarget oxidizing pollutants are selected from the group consisting of permanganates, peroxides, dichromates, arylmethane dyes, and mixtures thereof.

23. The process as in claim 17 wherein said alkali metal formaldehydebisulfite is combined with inert material selected from the group consisting of dilents, carriers, excipients, lubricants, disintegrants, colorants, and mixtures thereof.

24. The process as in claim 23 wherein said diluents and carriers are selected from the group consisting of salt sodium sulfate, potassium chloride, starch, sugars, clays, calcium sulfate, and mixtures thereof.

25. The process as in claim 23 wherein said excipients are selected from the group consisting of cellulose gum, povidone, starches, and mixtures thereof.

26. The process as in claim 23 wherein said lubricants are selected from the group consisting of calcium stearate, magnesium stearate, paraffin war, stearic acid, and mixtures thereof.

27. The process as in claim 23 wherein said disintegrants are selected from the group consisting of cross-linked povidone, sodium bicarbonate/citric acid, and mixtures thereof.

28. The process as in claim 23 wherein said colorants is acriflavine.

29. A process for neutralizing ammonia and a pollutant selected from the group consisting of chloraimes, chlorine, and mixtures thereof in aquaculture water having a pH in the range of about 6.0 to 9.0 by adding reactants to said water to produce an alkali metal formaldehydebisulfite selected from the group consisting of sodium formaldehydebisulfite and potassium formaldehydebisulfite in and amount sufficient to render said ammonia and said pollutant nontoxic to aquatic life in said water.

30. The process as in claim 29 wherein said reactants comprise a formaldehyde and water solution and a sodium bisulfite and water solution combined to produce sodium formaldehydebisulfite.

31. The process as in claim 30 wherein said formaldehyde comprises at least 9% by weight of said formaldehyde and water solution.

32. The process as in claim 30 wherein said sodium bisulfite comprises at least 33% by weight of said sodium bisulfite and water solution.

33. A process for neutralizing ammonia in aquaculture water having a pH in the range of about 6.0 to 9.0 by adding to said water an alkali metal formadehydebisulfite selected from the group consisting of sodium formaldehydebisulfite and potassium formaldehydebisulfite in an amount sufficient to render said ammonia nontoxic to aquatic life in said water.

34. The process as in claim 33 wherein said alkali metal formaldehydebisulfite is sodium formaldehydebisulfite.

35. The process as in claim 33 wherein said alkali metal formaldehydebisulfite is added in the amount at least equal to the greater of the quantity required to react on a one to one molecular basis with the stoichiometric amount of ammonia ($NH_3$) present in the water.

36. The process as in claim 33 wherein said alkali metal formaldehydebisulfite is added in the amount at least equal to the quantity required to react on a one to one molecular basis with 4 times the stoichiometric amount of ammonia ($NH_3$) present in said water.

37. The process as in claim 33 wherein said culture water is free from nontarget oxidizing pollutants.

38. The process as in claim 37 wherein said nontarget oxidizing pollutants are selected from the group consisting of permanganates, peroxides, dichormates, arylmethane dyes, and mixtures thereof.

39. The process as in claim 33 wherein said alkali metal formaldehydebisulfite is combined with inert material selected from the group consisting of diluents, carriers, excipients, lubricants, disintegrants, colorants, and mixtures thereof.

40. The process as in claim 39 wherein said diluents and carriers are selected from the group consisting of salt, sodium sulfate, potassium chloride, starch, sugars, clays, calcium sulfate, and mixtures thereof.

41. The process as in claim 39 wherein said excipients are selected from the group consisting of cellulose gum, povidone, starches, and mixtures thereof.

42. The process as in claim 39 wherein said lubricants are selected from the group consisting of calcium stearate, magnesium stearate, paraffin wax, stearic acid, and mixtures thereof.

43. The process as in claim 39 wherein said disintegrants are selected from the group consisting of cross-linked povidone, sodium bicarbonate/citric acid, and mixtures thereof.

44. The process as in claim 39 wherein said colorants is acriflavine.

45. A process for neutralizing ammonia in aquaculture water having a pH in the range of about 6.0 to 9.0 by adding reactants to said water to produce an alkali metal formaldehydebisulfite selected from the group consisting of sodium formaldehydebisulfite and potassium formaldehydebisulfite in an amount sufficient to render said ammonia nontoxic to aquatic life in said water.

46. The process as in claim 45 wherein said reactants comprise a formaldehyde and water solution and a sodium bisulfite and water solution combined to produce sodium formaldehydebisulfite.

47. The process as in claim 46 wherein said formaldehyde comprises at least 9% by weight of said formaldehyde and water solution.

48. The process as in claim 46 wherein said sodium bisulfite comprises at least 33% by weight of said sodium bisulfite and water solution.

* * * * *